United States Patent
Sharma

(10) Patent No.: US 9,787,852 B2
(45) Date of Patent: Oct. 10, 2017

(54) SEQUENCE NUMBER REUSE FOR CDR TRANSPORT USING GTP'

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 450 days.

(21) Appl. No.: 14/296,089

(22) Filed: Jun. 4, 2014

(65) Prior Publication Data

US 2015/0358480 A1    Dec. 10, 2015

(51) Int. Cl.
| | |
|---|---|
| *H04M 15/00* | (2006.01) |
| *H04W 4/24* | (2009.01) |
| *H04W 76/02* | (2009.01) |
| *H04L 12/14* | (2006.01) |

(52) U.S. Cl.
CPC ........ *H04M 15/65* (2013.01); *H04L 12/1403* (2013.01); *H04L 12/1425* (2013.01); *H04M 15/41* (2013.01); *H04W 4/24* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 6,798,742 B1* | 9/2004 | Mawhinney | H04L 12/2697 370/230 |
| 2003/0120802 A1* | 6/2003 | Kohno | H04L 29/06 709/237 |
| 2004/0047308 A1* | 3/2004 | Kavanagh | H04W 12/10 370/328 |
| 2004/0100913 A1* | 5/2004 | Kalliokulju | H04W 36/0055 370/252 |
| 2005/0120350 A1* | 6/2005 | Ni | H04L 29/12009 718/105 |
| 2005/0227667 A1* | 10/2005 | Jung | H04L 41/00 455/408 |
| 2005/0271071 A1* | 12/2005 | Madhavapeddi | H04L 12/2854 370/412 |

(Continued)

OTHER PUBLICATIONS

3rd Generation Partnership Project, Charging Data Record (CDR) Transfer, 3GPP TS 32.295, Version 12.0.0 (Sep. 2013).

(Continued)

*Primary Examiner* — Jenee Williams
(74) *Attorney, Agent, or Firm* — Duft Bornsen & Fettig, LLP

(57) ABSTRACT

Systems and methods that transport Charging Data Records (CDRs) using GTP' for offline charging. One embodiment comprises a Charging Data Function (CDF) that communicates with a Charging Gateway Function (CGF) of an offline charging system using GTP'. The CDF assembles a GTP' request for a transaction, assigns a sequence number for the transaction, and assigns a timestamp to the sequence number. The CDF inserts the sequence number in a GTP' header of the GTP' request, inserts the timestamp assigned to the sequence number in the GTP' header of the GTP' request, and sends the GTP' request to the CGF.

16 Claims, 8 Drawing Sheets

(56) References Cited

U.S. PATENT DOCUMENTS

| | | | |
|---|---|---|---|
| 2006/0007930 A1* | 1/2006 | Dorenbosch | H04L 12/1886 370/390 |
| 2006/0069787 A1* | 3/2006 | Sinclair | G06F 17/3089 709/229 |
| 2006/0265446 A1* | 11/2006 | Elgressy | G06F 21/445 709/200 |
| 2007/0036312 A1* | 2/2007 | Cai et al. | H04M 15/00 379/126 |
| 2007/0162289 A1* | 7/2007 | Olsson | H04L 12/14 455/405 |
| 2008/0101333 A1* | 5/2008 | Semper | H04W 36/02 370/350 |
| 2008/0117901 A1* | 5/2008 | Klammer | H04L 47/28 370/389 |
| 2008/0125082 A1* | 5/2008 | Salo | H04L 12/14 455/406 |
| 2008/0159240 A1* | 7/2008 | Hamilton | H04L 1/0079 370/338 |
| 2008/0177884 A1* | 7/2008 | Agarwal | H04L 1/1841 709/227 |
| 2008/0244009 A1* | 10/2008 | Rand | G06Q 10/107 709/206 |
| 2009/0010259 A1* | 1/2009 | Sirotkin | H04L 47/10 370/392 |
| 2009/0264097 A1* | 10/2009 | Cai | G06Q 30/04 455/406 |
| 2009/0296655 A1* | 12/2009 | Tamura | H04L 47/34 370/331 |
| 2010/0027524 A1* | 2/2010 | Santos Barreto | H04J 3/067 370/345 |
| 2010/0046434 A1* | 2/2010 | Weniger | H04W 8/06 370/328 |
| 2012/0009895 A1* | 1/2012 | Kotalwar | H04L 12/14 455/406 |
| 2012/0059749 A1* | 3/2012 | Sharma | G06Q 30/04 705/34 |
| 2012/0082089 A1* | 4/2012 | Nelakonda | H04L 12/4633 370/328 |
| 2012/0221881 A1* | 8/2012 | Webb, III | H04L 43/0852 713/400 |
| 2013/0007471 A1* | 1/2013 | Grab | G06F 21/10 713/193 |
| 2013/0272127 A1* | 10/2013 | Ali | H04L 43/12 370/235 |
| 2013/0282750 A1* | 10/2013 | Paul | G06F 17/30675 707/767 |
| 2014/0105044 A1* | 4/2014 | Baillargeon | H04L 43/0835 370/252 |
| 2014/0219100 A1* | 8/2014 | Pandey | H04W 28/08 370/236 |
| 2014/0269533 A1* | 9/2014 | Hua | H04L 49/90 370/329 |
| 2014/0293879 A1* | 10/2014 | Chen | H04L 12/1453 370/328 |
| 2014/0325115 A1* | 10/2014 | Ramsundar | G06F 12/0238 711/102 |
| 2015/0105044 A1* | 4/2015 | Maguire | H04L 67/16 455/406 |
| 2015/0139085 A1* | 5/2015 | Kaczmarska-Wojtania | H04L 5/0053 370/329 |

OTHER PUBLICATIONS

3rd Generation Partnership Project, Charging Data Record (CDR) File Format and Transfer, 3GPP TS 32.297, Version 12.0.0 (Mar. 2014).

* cited by examiner

GTP' HEADER

DATA RECORD TRANSFER REQUEST

| INFORMATION ELEMENT (IE) | PRESENCE REQUIREMENT |
|---|---|
| PACKET TRANSFER COMMAND | MANDATORY |
| DATA RECORD PACKET | CONDITIONAL |
| SEQUENCE NUMBERS OF RELEASED PACKETS | CONDITIONAL |
| SEQUENCE NUMBERS OF CANCELLED PACKETS | CONDITIONAL |
| PRIVATE EXTENSION | OPTIONAL |

DATA RECORD PACKET
INFORMATION ELEMENT (IE)

| TYPE = 252 |
|---|
| LENGTH |
| NUMBER OF DATA RECORDS |
| DATA RECORD FORMAT |
| DATA RECORD FORMAT VERSION |
| LENGTH OF DATA RECORD 1 |
| DATA RECORD 1 |
|  |
| LENGTH OF DATA RECORD *N* |
| DATA RECORD *N* |

DATA RECORD TRANSFER RESPONSE

| INFORMATION ELEMENT (IE) | PRESENCE REQUIREMENT |
|---|---|
| CAUSE | MANDATORY |
| REQUESTS RESPONDED | MANDATORY |
| PRIVATE EXTENSION | OPTIONAL |

SEQUENCE NUMBER REUSE FOR CDR TRANSPORT USING GTP'

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online billing functions to keep track of the charges incurred by each device for using the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS).

The CDF receives the charging events from one or more CTFs, and uses the information included in the charging events to construct CDRs. A CDR is a formatted collection of information about a chargeable event (e.g., time of call set-up, duration of the call, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), correlates the CDRs into a CDR file, and sends the CDR file to the billing domain (see 3GPP TS 32.297).

Errors may occur when a CDF sends CDRs to a CGF. Unfortunately, the standards do not address some of the errors that may occur in the transport of CDRs between a CDF and a CGF.

SUMMARY

Embodiments described herein propose reuse of sequence numbers for data record packets that are used to transport CDRs from a CDF to CGFs. The 3GPP specifies using GPRS Tunneling Protocol prime (GTP') to transport CDRs from a CDF to a CGF. When a CDF assembles a data record packet according to GTP', the CDF inserts a sequence number into the GTP' header to uniquely identify the transaction. However, there is a limited range of numbers available for the sequence numbers, and the number of transactions open for a CDF may exceed the number of sequence numbers available to the CDF. This may block the CDF from sending further CDRs to the CGF. The embodiments described herein assign a timestamp to a sequence number used in a CDR transport transaction between a CDF and a CGF. When a CDF assembles a data record packet according to GTP', the CDF inserts the sequence number into the GTP' header and also inserts the timestamp that is assigned to the sequence number. Because a timestamp is assigned to a sequence number, the same sequence number can be reused in different transactions yet the transactions can be differentiated by the timestamp. Previously, the sequence number of a packet was used by itself to identify each packet. According to the following embodiments, it would be the composite information consisting of the sequence number and the timestamp that would be used for identifying each packet uniquely. This advantageously avoids any confusion that may be caused if a sequence number is reused due to a large number of transactions occurring in a CDF that may be blocked on account of CDF-CGF failover and related procedures.

One embodiment comprises a CDF configured to communicate with a CGF of an offline charging system using GTP'. The CDF includes a processor configured to assemble a GTP' request for a transaction, to assign a sequence number for the transaction, and to assign a timestamp to the sequence number. The CDF is configured to insert the sequence number in a GTP' header of the GTP' request, to insert the timestamp assigned to the sequence number in the GTP' header of the GTP' request, and to send the GTP' request to the CGF.

In another embodiment, the CDF is configured to store an entry for the GTP' request that is referenced by the sequence number and the timestamp.

In another embodiment, the CDF is configured to receive a GTP' response for the transaction from the CGF, to process the GTP' header of the GTP' response to identify the sequence number, to process the GTP' header of the GTP' response to identify the timestamp assigned to the sequence number, and to identify the entry for the GTP' request based on the sequence number and the timestamp.

In another embodiment, the CGF is configured to receive the GTP' request from the CDF, to process the GTP' header of the request to identify the sequence number, to process the GTP' header of the request to identify the timestamp assigned to the sequence number, and to store an entry for the GTP' request that is referenced by the sequence number and the timestamp.

Another embodiment comprises a method for CDR transport. The method comprises assembling a GTP' request for a transaction in a CDF, where the CDF communicates with a CGF of an offline charging system using GTP'. The method further includes assigning a timestamp to the sequence number, inserting the sequence number in a GTP' header of the GTP' request, inserting the timestamp assigned to the sequence number in the GTP' header of the GTP' request, and sending the GTP' request from the CDF to the CGF.

Another embodiment comprises a CGF of an offline charging system that is configured to communicate with a CDF using GTP'. The CGF is configured to receive a GTP' request from the CDF for a transaction, to process a GTP' header of the GTP' request to identify a sequence number assigned to the transaction, to process the GTP' header of the GTP' request to identify a timestamp assigned to the sequence number, and to store an entry for the GTP' request that is referenced by the sequence number and the timestamp.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
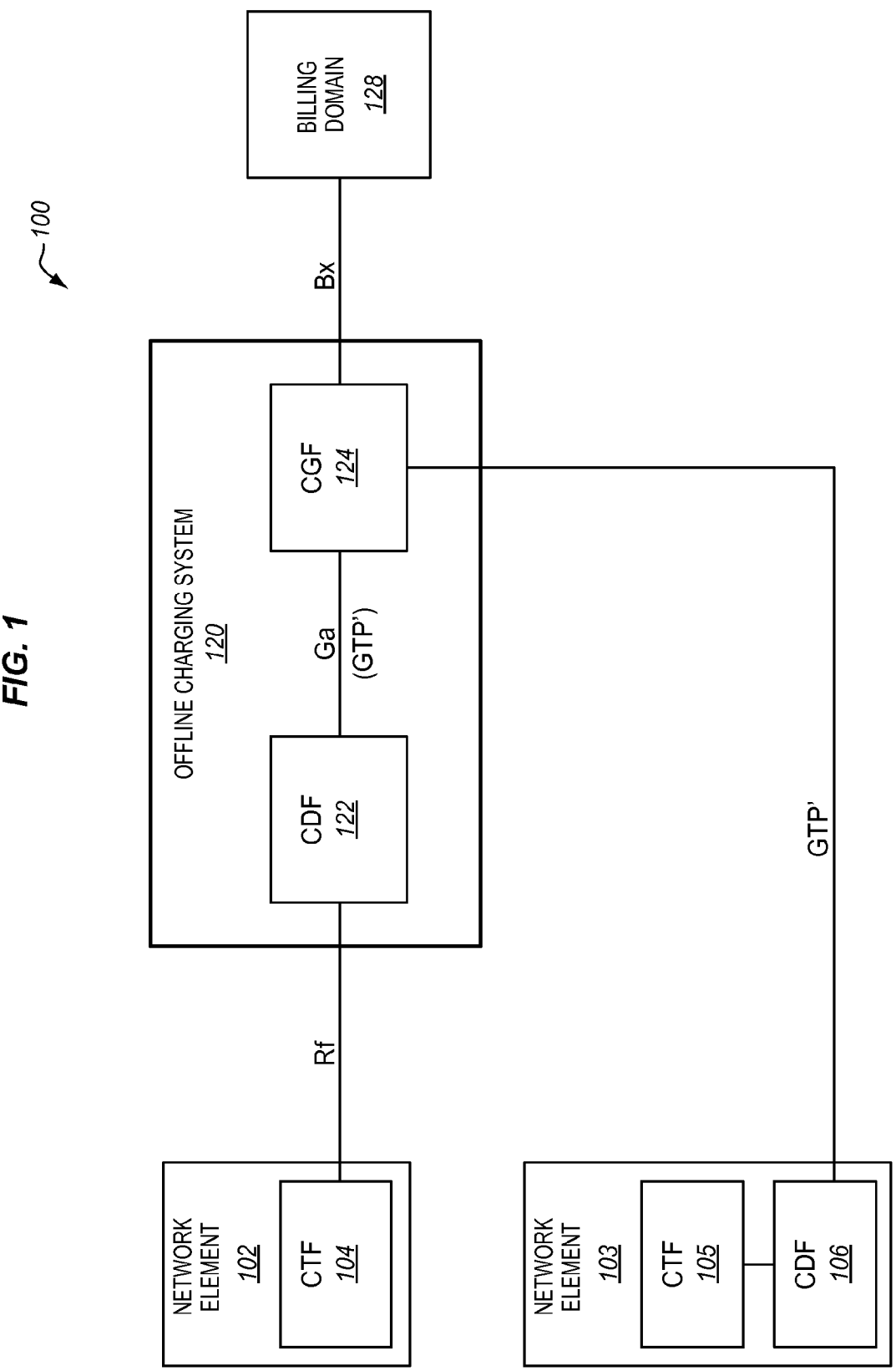
FIG. 1 illustrates an offline charging architecture.

FIG. 1 illustrates an offline charging architecture 100. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes network elements 102-103 that connect to an offline charging system (OFCS) 120. A network element 102-103 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 connects to OFCS 120 over a Diameter Rf interface. Therefore, CTF 104 assembles the charging information into accounting requests, such as a Diameter Rf Accounting Request (ACR), and sends the accounting requests to OFCS 120 via the Diameter Rf interface. Although not specifically illustrated in FIG. 1, network element 102 may include a processor or other hardware component to implement CTF 104.

Network element 103 includes a CTF 105, and also includes a Charging Data Function (CDF) 106. CTF 105 detects chargeable events for services provided by network element 103, assembles information for the chargeable events into matching charging events, and sends the charging events to CDF 106. CDF 106 formats the charging information received from CTF 105 into CDRs, and forwards the CDRs to a Charging Gateway Function (CGF) within OFCS 120. In the case of network element 103, CDF 106 connects to OFCS 120 over an interface using GPRS Tunneling Protocol prime (GTP'). GTP' is an IP-based protocol that is used for transporting charging information. CDR transport using GTP' is defined in the 3GPP specifications, such as TS 32.295 and TS 32.297.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, the CTF may transmit multiple ACR Interims depending on the proceeding of the session.

OFCS 120 includes a CDF 122 and a CGF 124. CDF 122 comprises an element or module within OFCS 120 that receives charging events from CTFs within network elements, formats the charging events into CDRs, and sends the CDRs to CGF 124. CDF 122 communicates with CGF 124 over the Ga reference point. In the case shown in FIG. 1, GTP' is used on the Ga reference point to transport CDRs from CDF 122 to CGF 124. CGF 124 comprises an element or module within OFCS 120 that correlates CDRs for a session, and makes a CDR file with the CDRs available to a billing domain 128. Billing domain 128 is the part of the operator network that receives and processes CDR files for billing mediation and other billing applications (e.g., statistical applications). Although not specifically illustrated in FIG. 1, OFCS 120 may include one or more processors or other hardware components that implement CDF 122 and CGF 124.

Figures 2, 3:
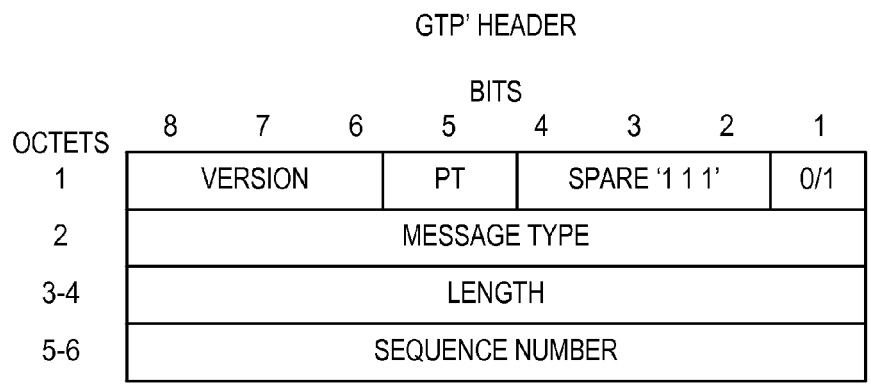
FIG. 2 illustrates a GTP' header.
FIG. 3 illustrates Information Elements (IE) specified for a Data Record Transfer Request.

GTP' is designed to deliver CDRs from CDF 122 (or CDF 106) to CGF 124. To transfer CDRs, CDF 122 generates a message with a GTP' header. FIG. 2 illustrates a GTP' header. The first octet of the GTP' header indicates the version of GTP' (bits 6-8) being utilized, and the protocol type (PT) flag (bit 5). Octet 2 indicates the "Message Type" for the message. For example, the message type may be "Node Alive Request", "Node Alive Response", "Redirection Request", "Redirection Response", "Data Record Transfer Request", "Data Record Transfer Response", etc. Octets 3-4 of the GTP' header indicate the "Length" of the payload (i.e., the number of octets after the header). Octets 5-6 indicate the "Sequence Number". GTP' uses request/response transactions. Each transaction is indicated by a sequence number in the range of 0-65535.

The GTP' message generated by CDF 122 also includes a payload. The payload includes one or more Information Elements (IE) that is appended to the header depending on the type of message being sent. For example, a Data Record Transfer Request is used to transport CDRs in GTP'. FIG. 3 illustrates the IE's specified for a Data Record Transfer Request. In this request, one of the IE's is "Packet Transfer Command", which specifies the nature of the message. The values of the Packet Transfer Command may be as follows:
1='Send Data Record Packet';
2='Send possibly duplicated Data Record Packet';
3='Cancel Data Record Packet';
4='Release Data Record Packet'.

Figures 4, 5, 6:
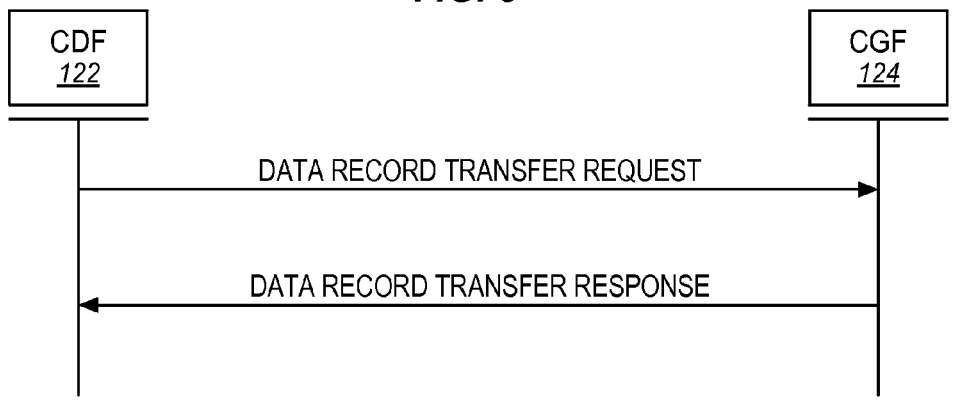
FIG. 4 illustrates a Data Record Packet Information Element (IE).
FIG. 5 illustrates a CDR transfer from a CDF to a CGF.
FIG. 6 illustrates Information Elements (IE) specified for a Data Record Transfer Response.

Another of the IE's is "Data Record Packet", which is the IE that stores the CDRs for transport. Because the "Data Record Packet" stores CDRs, the CDRs are sometimes referred to as being transported in a packet or data record packet. FIG. 4 illustrates a Data Record Packet IE. The first field (octet 1) of the Data Record Packet IE indicates the type of the IE (a value of 252=Data Record Packet). The second field (octets 2-3) of the Data Record Packet IE is the "Length" field that indicates the length of the IE. The third field (octet 4) is the "Number of Data Records" field that indicates the number of data records (i.e., CDRs) inserted in the IE. The fourth field (octet 5) indicates the format of the CDRs (e.g., ASN.1). The fifth field (octets 6-7) indicates the 3GPP Technical Specifications release and version number used for CDR encoding. The remaining fields are for the CDRs. A "Length of Data Record" field and a "Data Record" field are used for each CDR being transported to indicate a length of the CDR, and to store the information for the CDR. This IE may contain 0, 1, . . . , n data records.

Referring back to FIG. 3, the other IEs for the Data Record Transfer request are "Sequence Numbers of Released Packets", "Sequence Numbers of Cancelled Packets", and "Private Extension".

FIG. 5 illustrates a CDR transfer from CDF 122 to CGF 124. To transfer CDRs in a conventional manner, CDF 122 assembles a Data Record Transfer Request by populating the GTP' header of the request. This includes inserting a value into the "Message Type" field to indicate a Data Record Transfer Request (see FIG. 2), and also includes inserting sequence number that is assigned to this transaction into the "Sequence Number" field. CDF 122 also populates the IE's of the Data Record Transfer Request, which includes populating the Data Record Packet IE with the CDRs being transported. CDF 122 then sends the Data Record Transfer Request to CGF 124.

In order to support error handling, CDF 122 maintains an internal send buffer of the pending transactions. Thus, CDF 122 stores the sequence numbers for requests not yet successfully responded to by the primary CGF (CGF 124). If CDF 122 were to lose its connection to CGF 124 (e.g., due to a link failure or CGF 124 going down), CDF 122 may attempt to redirect the CDR traffic to a secondary CGF (not shown in FIG. 1).

When CGF 124 receives the Data Record Transfer Request, CGF 124 opens the request and stores its contents (e.g., in a non-volatile memory). CGF 124 then assembles a Data Record Transfer Response, and sends the Data Record Transfer Response back to CDF 122 (assuming the connection is still available). FIG. 6 illustrates the IEs specified for a Data Record Transfer Response. One of the IE's is "Cause", which indicates the status of one or more Data Record Transfer Requests. For example, the cause value of "Request Accepted" indicates that a Data Record Transfer Request was successfully received, while the cause value of "No Resources Available" indicates that a Data Record Transfer Request was not successfully received. Another one of the IE for the Data Record Transfer Response is "Requests Responded". Because a Data Record Transfer Response may be used to answer for one or more Requests, this IE indicates the sequence numbers of the Data Record Transfer Requests for which this Response is answering. The Private Extension IE contains vendor or operator specific information.

In FIG. 5, it is assumed that the Data Record Transfer Request was successfully received, so CGF 124 populates the Data Record Transfer Response with a cause value ("Request Accepted") indicating a successful packet reception, and sends the response to CDF 122. After the positive response is received, CDF 122 deletes the information for the transaction(s) related to the sequence number provided in the response.

Currently, the standards define the sequence number in the GTP' header as 16 bits (octets 5-6) as shown in FIG. 2. Therefore, the sequence number can assume a value from the range 0-65535. One problem is that a CDF can run out of sequence numbers to use for CDR transport, and get into a deadlock with the CGFs. The following scenario is given to illustrate the potential problem. In FIG. 1, CDF 122 sends a data packet with sequence number "XYZ" to CGF 124 using a Data Record Transfer Request, with the Packet Transfer Command IE having the value "Send Data Record Packet". If CDF 122 gets no response from CGF 124 for this transaction (e.g., CGF 124 stores the data packet successfully but the response is never delivered to CDF 122, or CGF 124 had a failure before storing the data packet and never sent a response), then CDF 122 checks a CGF preference list and selects another CGF (CGF2, not shown in FIG. 1) as an alternative. CDF 122 ensures that it is able to communicate with CGF2 via an Echo Request/Response mechanism, and then sends a Data Record Transfer Request to CGF2 with sequence number "XYZ" to the CGF2 with the Packet Transfer Command IE having the value "Send possible duplicated Data Record Packet". If CGF2 successfully stores the data record packet, then it responds with a Data Record Transfer Response with the cause value "Request Accepted". Because this data record packet was marked as potentially duplicated, CGF2 stores the data record packet and waits for further communication from CDF 122. Meanwhile, as CGF 124 continues to remain out of service, CDF 122 continues to send data record packets to CGF2 for other transactions until it too becomes out of service. When this occurs, CDF 122 looks up the CGF preference list and selects yet another CGF (CGF3) as the recipient of its data record packets for other transactions. It may be the case that the sequence number is reset or recycled, and starts from 0 again. If CDF 122 continues to send data record packets to CGF3 until the sequence number becomes "XYZ", then the data contained in this data record packet is not the same as the data contained in the earlier iteration of sequence number "XYZ" that is still being stored in CDF 122 and CGF2. If CGF3 goes down and the CGF preference list in CDF 122 were to point to CGF 124 or CGF2 (assuming they are now in service), either CGF may receive a potentially duplicate data record packet with sequence number "XYZ". Thus, the CGF would have two different data record packets for two different transactions that have the same sequence number of "XYZ". In order to avoid this, the CDFs maintain a list of sequence numbers of packets that have not yet been disposed off correctly. Therefore, the CDF tries not to reuse a sequence number that has not yet been acknowledged by the CGF to have been made available for the billing mediation system.

Although a CDF would have to run through 65535 sequence numbers in order for the sequence number to roll over, this can happen quickly. Even a small OFCS is capable of generating thousands of CDRs per second, and potentially rolling over the sequence number in a minute or less. Also, a CDF may put exactly one CDR in a data packet record per transaction to achieve record-by-record transmission reliability. While this may be a robust scheme, the effect is that the sequence numbers are rolled over very quickly. In a worst-case scenario, a CDF may run out of sequence numbers and get into a deadlock with the CGFs, the existing data record packets on the CGFs cannot be disposed of pending release or cancellation from the CDF, and the CDF itself is unable to send CDRs that it is continuously generating.

Figure 7:
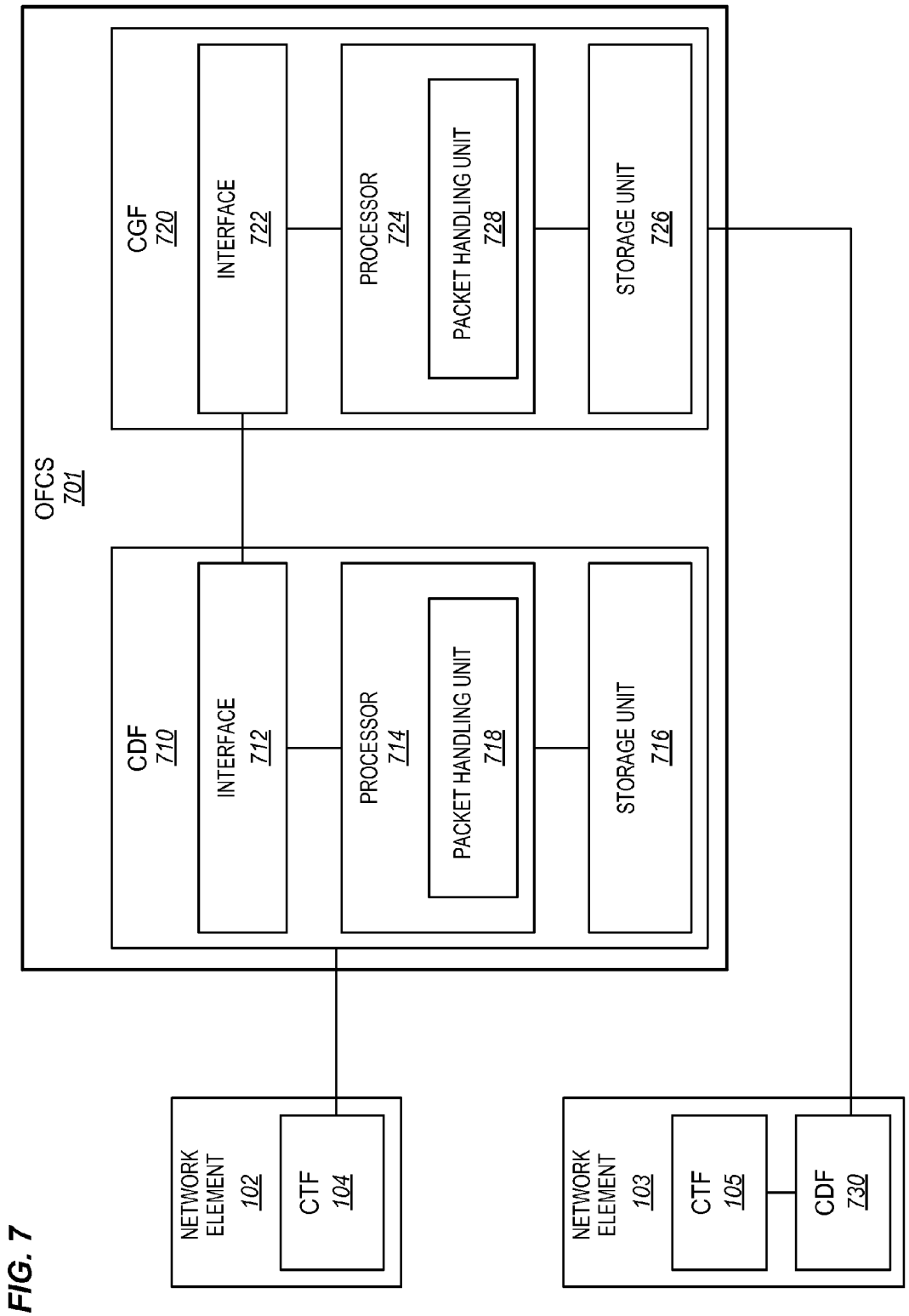
FIG. 7 illustrates an offline charging architecture in an exemplary embodiment.

To solve this and other problems, the embodiments described reuse sequence numbers for transactions by assigning a timestamp to the sequence numbers. FIG. 7 illustrates an offline charging architecture 700 in an exemplary embodiment. Architecture 700 includes an OFCS 701 having a CDF 710 coupled to a CGF 720. In this embodiment, CDF 710 includes an interface 712, a processor 714, and a storage unit 716. Interface 712 comprises a component (e.g., hardware, software, or a combination of hardware and software) for communicating with CGF 720 via GTP'. Processor 714 comprises a component that performs the functions of a CDF. Storage unit 716 comprises a component that stores data, such as a memory. In this embodiment, CDF 710 includes a packet handling unit 718, which is a component (e.g., hardware, software, or a combination of hardware and software) that is able to process GTP' requests and responses having both a sequence number and a timestamp. A more detailed explanation of packet handling unit 718 is provided below. CDF 730 is illustrated as being implemented in a network element 103, and this CDF may have a similar configuration and operation as CDF 710.

CGF 720 includes an interface 722, a processor 724, and a storage unit 726. Interface 722 comprises a component (e.g., hardware, software, or a combination of hardware and software) for communicating with CDF 710 via GTP'. Processor 724 comprises a component that performs the functions of a CGF. Storage unit 726 comprises a component that stores data, such as a memory. In this embodiment, CGF 720 includes a packet handling unit 728, which is a component (e.g., hardware, software, or a combination of hardware and software) that is able to process GTP' requests and responses having both a sequence number and a timestamp. A more detailed explanation of packet handling unit 728 is provided below.

Figure 8:
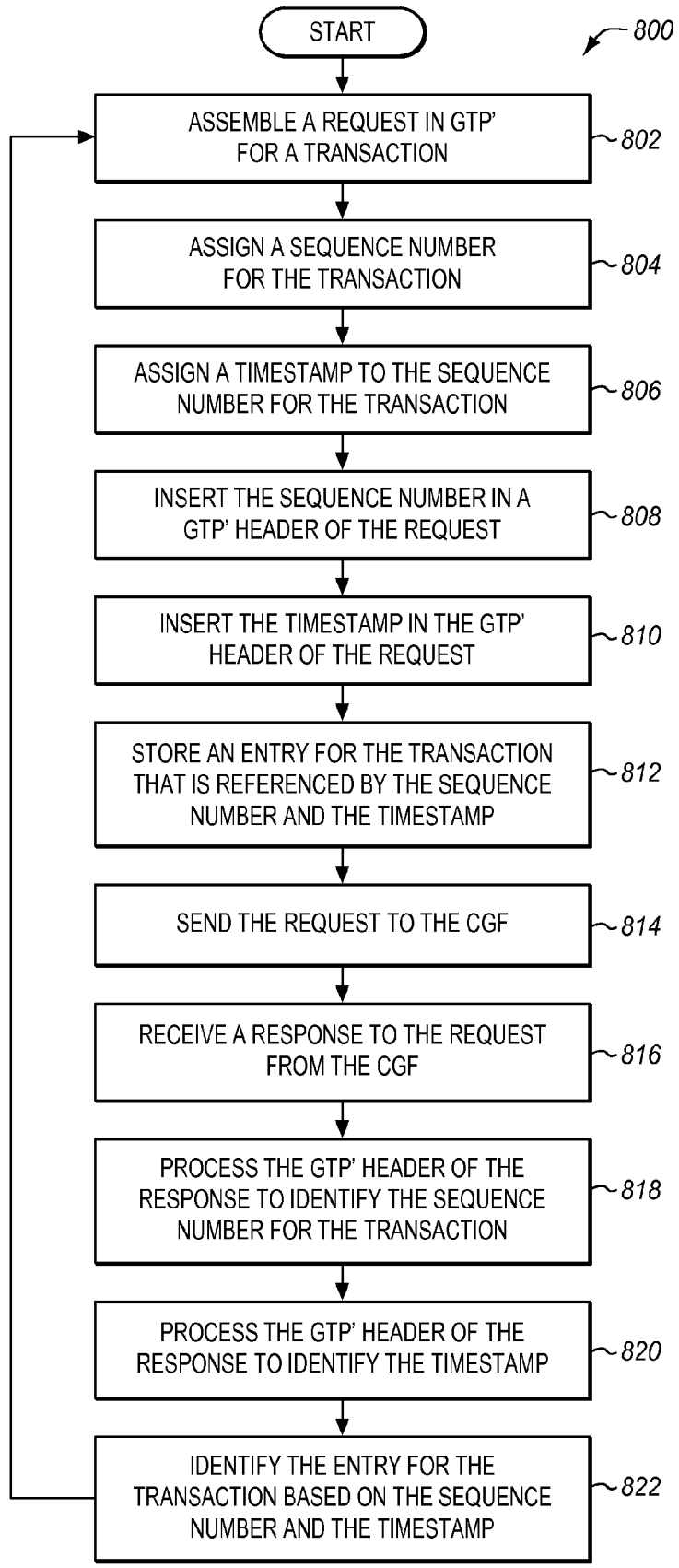
FIGS. 8-9 are flow charts illustrating processes for CDR transport in an exemplary embodiment.
Figure 9:
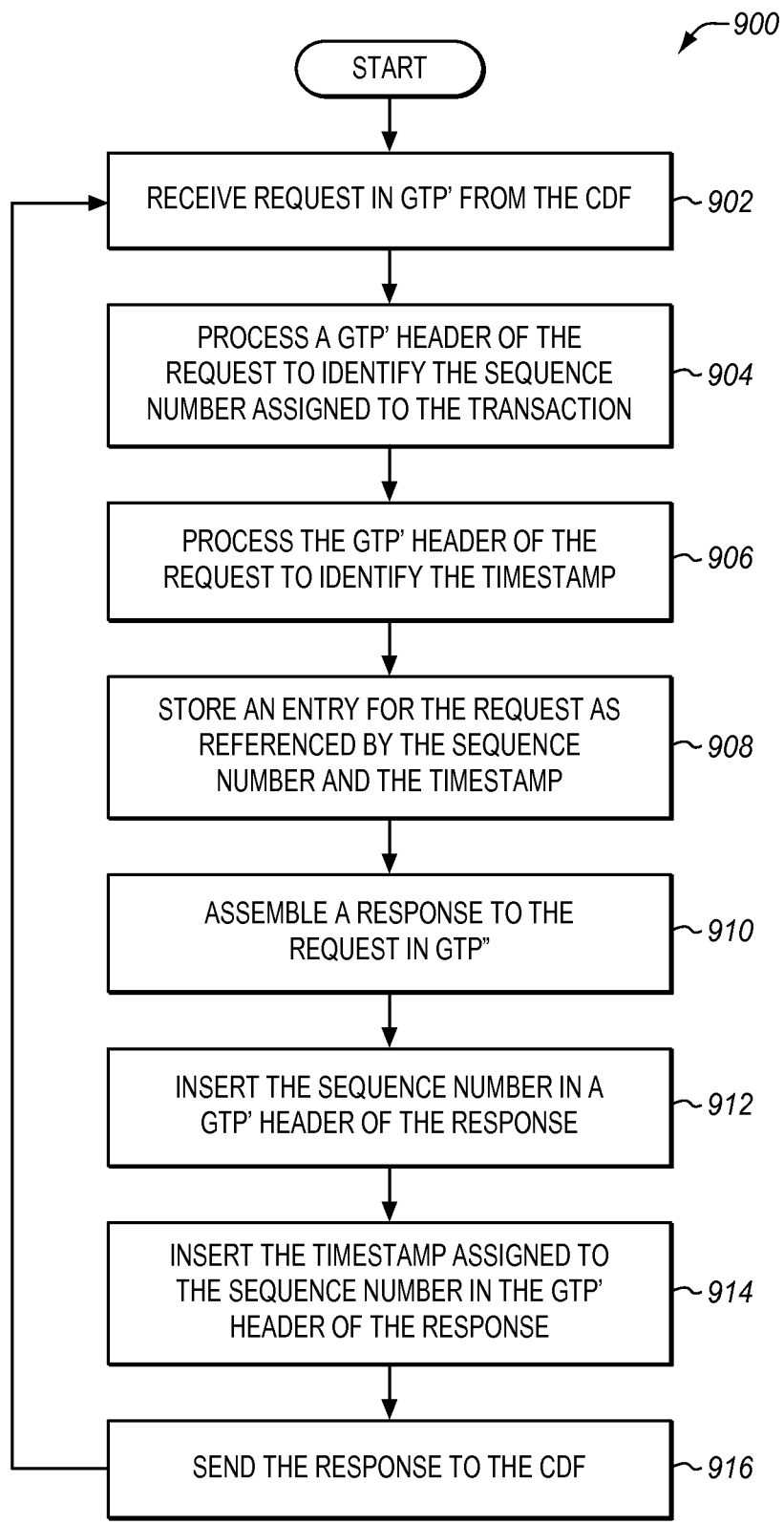

It is assumed for this embodiment that CDF 710 is prepared to transfer CDRs to CGF 720. FIGS. 8-9 are flow charts illustrating processes for CDR transport in an exemplary embodiment. The method 800 shown in FIG. 8 is performed in CDF 710 for each transaction between the CDF and the CGF, with multiple such transactions in progress in parallel simultaneously. The steps of the flow charts described herein are not all inclusive and may include other steps not shown, and the steps may be performed in an alternative order.

To transfer CDRs to CGF 720, packet handling unit 718 (through processor 714) in CDF 710 assembles a request in GTP' (step 802) for a transaction. A request in GTP' comprises any request that uses a GTP' header. Examples of a GTP' request are a Data Record Transfer Request, a Redirection Request, a Node Alive Request, etc. In assembling the request, packet handling unit 718 assigns a sequence number to the transaction (step 804). As described above, GTP' is a stateful sequence of one or more transactions. Therefore, packet handling unit 718 assigns a sequence number to this transaction. Packet handling unit 718 also assigns a timestamp to the sequence number (step 806). When a timestamp is "assigned to a sequence number", the timestamp is assigned to the transaction indicated by the sequence number. Therefore, the timestamp is associated with the sequence number in such a way that the combination of the two can be used to uniquely identify the transaction. The timestamp is therefore assigned to the sequence number for the duration of the transaction. The CDF uses its network-synchronized current time for assigning the value to the timestamp.

Figure 10:
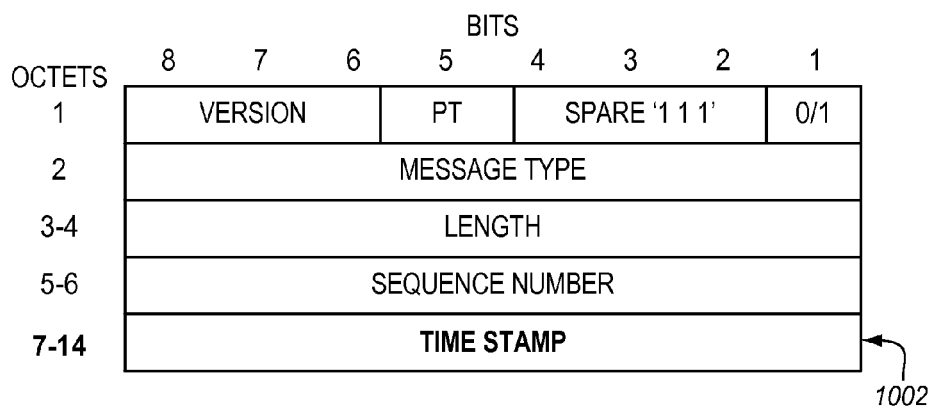
FIG. 10 illustrates the GTP' header with a timestamp field in an exemplary embodiment.

Packet handling unit 718 then inserts the sequence number in the GTP' header of the request (step 808), such as in the "Sequence Number" field of the GTP' header. Packet handling unit 718 also inserts the timestamp assigned to the sequence number in the GTP' header (step 810). To do so, a new field is defined for the timestamp in the GTP' header. FIG. 10 illustrates the GTP' header with a timestamp field in an exemplary embodiment. The timestamp field 1002 is an extension or enhancement to the GTP' header. In one embodiment, timestamp field 1002 is defined as octets 7-14 of the GTP' header. The timestamp inserted into field 1002 may comprise a 64-bit UNIX timestamp.

The timestamp field may be populated for each transaction initiated by CDF 710. In another embodiment, the timestamp field of the GTP' header may be conditional and used for only certain transactions. The timestamp field may be used for requests that transfer CDRs. For example, CDF 710 may insert a timestamp in the GTP' header of a request when the request comprises a Data Record Transfer Request.

Packet handling unit 718 stores an entry for the transaction (i.e., for the request) that is referenced by the sequence number and the timestamp (step 812) in a send buffer (e.g., in storage unit 716). Packet handling unit 718 uses the send buffer to store information on transactions that are not successfully responded to by CGF 720 (i.e., its primary CGF). The entries are referenced by both the sequence number and the timestamp assigned to the sequence number. Packet handling unit 718 may also store information for the CDRs that were sent during this transaction.

Packet handling unit 718 then sends the request to CGF 720 through interface 712 (step 814).

The process 900 shown in FIG. 9 is performed in CGF 720. CGF 720 receives the request from CDF 710 through interface 722 (step 902). Packet handling unit 728 in CGF 720 opens the request, and stores the contents of the data record packet in storage unit 726 (if any). Packet handling unit 728 (as provided by processor 724) processes the GTP' header of the request to identify the sequence number assigned to the transaction (step 904). Packet handling unit 728 also processes the GTP' header of the request to identify the timestamp assigned to the sequence number (step 906). Packet handling unit 728 then stores an entry for the transaction that is referenced by the sequence number and the timestamp (step 908) in a receive buffer (e.g., in storage unit 726). Packet handling unit 728 uses the receive buffer to store information on transactions that are not successfully handled. The entries are referenced by both the sequence number and the timestamp assigned to the sequence number. Packet handling unit 728 may also store information for the CDRs that were sent during this transaction.

Packet handling unit 728 assembles a response in GTP' to the request (step 910). A response in GTP' comprises any response that uses a GTP' header. Examples of GTP' responses are a Data Record Transfer Response, a Redirection Response, a Node Alive Response, etc. In assembling the response, packet handling unit 728 inserts the sequence number in the GTP' header of the response for the transaction (step 912). For example, if the request for this transaction has the sequence number "XYZ", then packet handling unit 728 inserts the sequence number of "XYZ" in the response. Packet handling unit 728 also inserts the timestamp assigned to the sequence number in the GTP' header of the response (step 914). When packet handling unit 728 receives the request and stores the sequence number for the request, packet handling unit 728 also stores the timestamp along with the sequence number. Therefore, this timestamp is assigned to the sequence number until the sequence number is discharged by CDF 710. Packet handling unit 728 then sends the response to CDF 710 through interface 722 (step 916).

Referring back to FIG. 8, packet handling unit 718 within CDF 710 receives the response from CGF 720 (step 816) for the request. Packet handling unit 718 processes the GTP' header of the response to identify the sequence number for the transaction (step 818). Packet handling unit 718 also processes the GTP' header of the response to identify the timestamp assigned to the sequence number (step 820). Packet handling unit 718 then identifies the entry in its send buffer for the transaction based on the sequence number and the timestamp (step 822). Packet handling unit 718 can then process the data in this entry of the send buffer based on the response received from CGF 720. For example, if the response indicates that the request for the transaction was successfully accepted by CGF 720, then packet handling unit 718 may delete the entry associated with the sequence number and the timestamp. If the response indicates that the request for the transaction was not successfully accepted by CGF 720, then packet handling unit 718 may update the entry associated with the sequence number and the timestamp, and initiate error handling routines.

By assigning a timestamp to a sequence number as described above, the same sequence number can be reused in different transactions yet the transactions can be differentiated by the timestamp. This advantageously avoids the situation where the same sequence number is reused in different transactions, and a CDF or CGF is unable to differentiate different transactions based solely on the sequence number.

Figure 11:
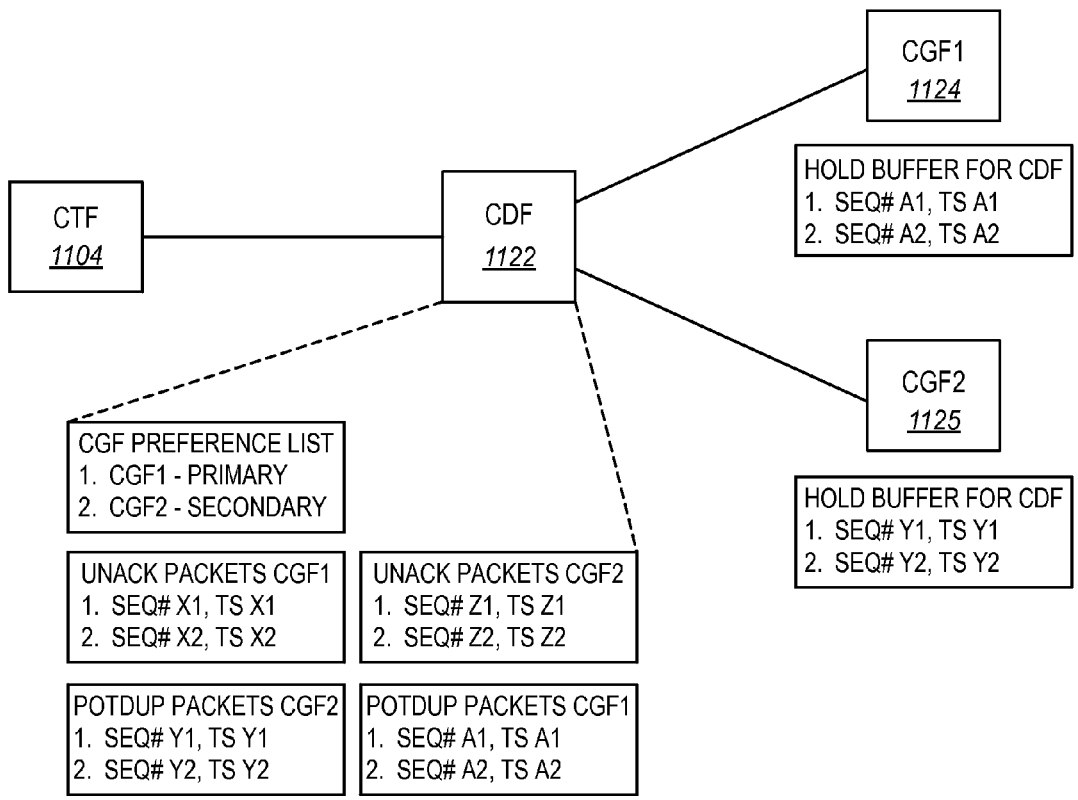
FIG. 11 illustrates use of timestamps in an offline charging architecture in an exemplary embodiment.

FIG. 11 illustrates use of timestamps in an offline charging architecture in an exemplary embodiment. The offline charging architecture in FIG. 11 includes a CTF 1104, a CDF 1122, and CGFs 1124-1125. When transporting CDRs in GTP' requests, CDF 1122 maintains an internal send buffer of the pending transactions. The send buffer includes data for unacknowledged (UNACK) requests sent to each CGF 1124-1125. The send buffer also includes data for potentially duplicated requests sent to each CGF 1124-1125. As is evident in this example, a timestamp (TS) is stored in the send buffer with its corresponding sequence number (SEQ#). For example, the unacknowledged (UNACK) requests sent to CGF 1124 are identified by sequence number "X1" and timestamp "X1", and by sequence number "X2" and timestamp "X2". The potentially duplicated requests sent to CGF 1125 are identified by sequence number "Y1" and timestamp "Y1", and sequence number "Y2" and timestamp "Y2".

CGFs 1124-1125 also maintain internal hold buffers for each CDF (there is only one CDF in this case). The internal hold buffers of CGFs 1124-1125 also associate the timestamp with the sequence number for a transaction. For example, the requests in the hold buffer of CGF 1124 are identified by sequence number "A1" and timestamp "A1", and by sequence number "A2" and timestamp "A2". The requests in the hold buffer of CGF 1125 are identified by sequence number "Y1" and timestamp "Y1", and by sequence number "Y2" and timestamp "Y2".

Figure 12:
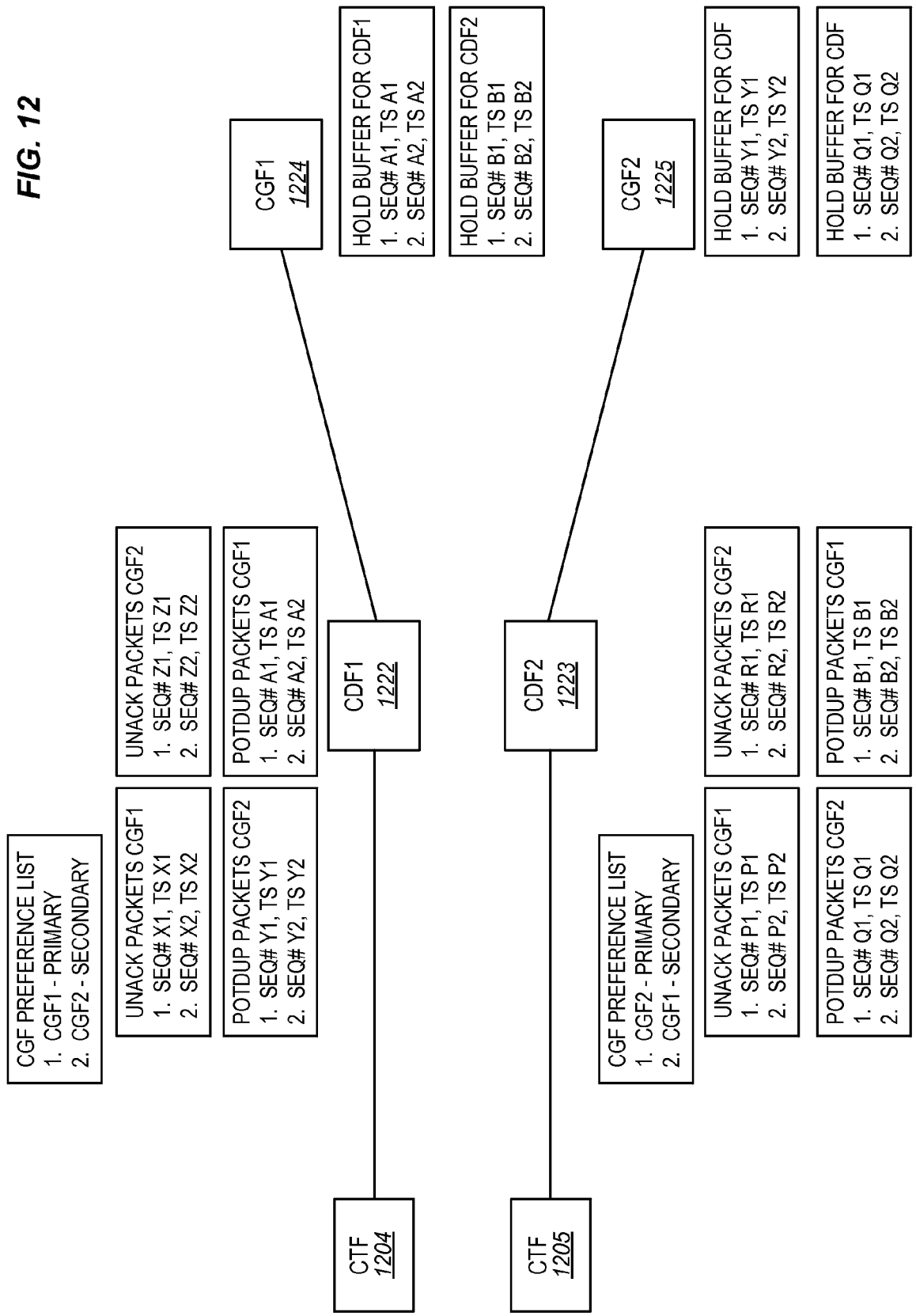
FIG. 12 illustrates another use of timestamps in an offline charging architecture in an exemplary embodiment.

FIG. 12 illustrates another use of timestamps in an offline charging architecture in an exemplary embodiment. The offline charging architecture in FIG. 12 includes CTFs 1204-1205, CDFs 1222-1223, and CGFs 1224-1225. Each CDF 1222-1223 maintains a send buffer that stores transaction information based on a sequence number and a timestamp. Also, each CGF 1224-1225 maintains a hold buffer that stores transaction information based on a sequence number and a timestamp.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. An apparatus comprising:
 a Charging Data Function (CDF) including an interface component configured to communicate with a Charging Gateway Function (CGF) of an offline charging system using GPRS Tunneling Protocol prime (GTP');

the CDF including a processor that assembles a GTP' request for a transaction, assigns a sequence number for the transaction, assigns a timestamp to the sequence number for the duration of the transaction, inserts the sequence number in a GTP' header of the GTP' request, inserts the timestamp assigned to the sequence number in the GTP' header of the GTP' request, sends the GTP' request to the CGF through the interface component, and stores an entry for the transaction in a send buffer that is referenced by the sequence number and the timestamp;

the processor receives a GTP' response for the transaction from the CGF through the interface component, processes the GTP' header of the GTP' response to identify the sequence number, processes the GTP' header of the GTP' response to identify the timestamp assigned to the sequence number, identifies the entry in the send buffer that is referenced by the sequence number and the timestamp, and deletes the entry from the send buffer when the GTP' response indicates that the GTP' request was accepted by the CGF.

2. The apparatus of claim 1 wherein:
a timestamp field is defined in the GTP' header.

3. The apparatus of claim 2 wherein:
the timestamp field comprises a 64-bit UNIX timestamp.

4. The apparatus of claim 2 wherein:
the timestamp field is defined as octets 7-14 of the GTP' header.

5. The apparatus of claim 1 wherein:
the processor inserts the timestamp in the GTP' header when the GTP' request comprises a GTP' Data Record Transfer Request.

6. The apparatus of claim 1 wherein:
the CGF receives the GTP' request from the CDF, processes the GTP' header of the GTP' request to identify the sequence number, processes the GTP' header of the GTP' request to identify the timestamp assigned to the sequence number, and stores another entry for the transaction that is referenced by the sequence number and the timestamp.

7. The apparatus of claim 6 wherein:
the CGF stores the other entry for the transaction that is further referenced by an identifier for the CDF.

8. A method comprising:
assembling a GPRS Tunneling Protocol prime (GTP') request for a transaction in a Charging Data Function (CDF), wherein the CDF communicates with a Charging Gateway Function (CGF) of an offline charging system using GTP';

assigning, at the CDF, a sequence number for the transaction;

assigning a timestamp to the sequence number for the duration of the transaction;

inserting the sequence number in a GTP' header of the GTP' request;

inserting the timestamp assigned to the sequence number in the GTP' header of the GTP' request;

sending the GTP' request from the CDF to the CGF;

storing an entry for the transaction in a send buffer of the CDF that is referenced by the sequence number and the timestamp;

receiving a GTP' response for the transaction in the CDF from the CGF;

processing, at the CDF, the GTP' header of the GTP' response to identify the sequence number;

processing the GTP' header of the GTP' response to identify the timestamp assigned to the sequence number;

identifying the entry in the send buffer that is referenced by the sequence number and the timestamp; and deleting the entry from the send buffer when the GTP' response indicates that the GTP' request was accepted by the CGF.

9. The method of claim 8 wherein:
a timestamp field is defined in the GTP' header.

10. The method of claim 9 wherein:
the timestamp field comprises a 64-bit UNIX timestamp.

11. The method of claim 9 wherein:
the timestamp field is defined as octets 7-14 of the GTP' header.

12. The method of claim 8 wherein inserting the timestamp comprises:
inserting the timestamp in the GTP' header when the GTP' request comprises a GTP' Data Record Transfer Request.

13. The method of claim 8 further comprising:
receiving the GTP' request in the CGF from the CDF;
processing, at the CGF, the GTP' header of the GTP' request to identify the sequence number;
processing, at the CGF, the GTP' header of the GTP' request to identify the timestamp assigned to the sequence number; and
storing another entry for the transaction in the CGF that is referenced by the sequence number and the timestamp.

14. The method of claim 13 wherein storing another entry for the transaction in the CGF comprises:
storing the other entry for the transaction that is further referenced by the sequence number, the timestamp, and an identifier for the CDF.

15. An apparatus comprising:
a Charging Gateway Function (CGF) of an offline charging system that includes an interface component configured to communicate with a Charging Data Function (CDF) using GPRS Tunneling Protocol prime (GTP');

the CGF includes a processor that receives a GTP' request from the CDF for a transaction through the interface component, processes a GTP' header of the GTP' request to identify a sequence number assigned to the transaction, processes the GTP' header of the GTP' request to identify a timestamp assigned to the sequence number, and stores an entry for the transaction in a receive buffer that is referenced by the sequence number and the timestamp;

the processor assembles a GTP' response for the transaction, inserts the sequence number in a GTP' header of the GTP' response, inserts the timestamp assigned to the sequence number in the GTP' header of the GTP' response, and sends the GTP' response to the CDF through the interface component;

wherein the processor stores the entry for the transaction in the receive buffer that is referenced by the sequence number and the timestamp until the sequence number is discharged by the CDF.

16. The apparatus of claim 15 wherein:
a timestamp field is defined in the GTP' header.

* * * * *